United States Patent [19]

Goubeaux et al.

[11] Patent Number: 5,022,234
[45] Date of Patent: Jun. 11, 1991

[54] CONTROL METHOD FOR A VARIABLE DISPLACEMENT AIR CONDITIONING SYSTEM COMPRESSOR

[75] Inventors: Ronald J. Goubeaux, Lockport; Joseph L. Spurney, Rochester, both of N.Y.

[73] Assignee: General Motors Corporation, Detroit, Mich.

[21] Appl. No.: 533,303

[22] Filed: Jun. 4, 1990

[51] Int. Cl.$^5$ .............................. F25B 1/00
[52] U.S. Cl. .................. 62/228.5; 62/228.3; 62/196.3; 236/78 D
[58] Field of Search .............. 62/228.5, 228.3, 228.1, 62/228.4, 215, 217, 226, 227, 229, 231, 196.1, 196.2, 196.3, 157, 158; 236/1 EA, 78 D

[56] References Cited

U.S. PATENT DOCUMENTS

| | | | |
|---|---|---|---|
| 4,356,961 | 11/1982 | Smith | 236/1 EA |
| 4,539,820 | 9/1985 | Zinsmeyer | 62/217 |
| 4,689,967 | 9/1987 | Han et al. | 62/228.5 |

Primary Examiner—Harry B. Tanner
Attorney, Agent, or Firm—Mark A. Navarre

[57] ABSTRACT

A control method for a variable capacity automotive air conditioning compressor in which the compressor operating point is tailored to the nonlinear control characteristics of variable displacement compressors. When the error between the desired and actual values of a specified system parameter is relatively large, the operating point is determined by a coarse gain closed-loop control. When the error is within a fine control range defined in relation to the desired value, the control point is set to one of three predetermined values for effecting small displacement increases, small displacement decreases, or no change in displacement. An adaptive tuning technique is used to update the predetermined control point values to compensate for compressor-to-compressor differences and changes in the operating conditions of a given compressor system. An anticipation technique shortens the transition from coarse control to fine control by minimizing gross overshoots of the specified system parameter.

12 Claims, 7 Drawing Sheets

CONTROL METHOD FOR A VARIABLE DISPLACEMENT AIR CONDITIONING SYSTEM COMPRESSOR

This invention pertains to the control of a variable displacement air conditioning system compressor, and more particularly, to a control method which maintain a specified system parameter at a desired value.

BACKGROUND OF THE INVENTION

Variable displacement refrigerant compressors have been employed in engine driven automotive air conditioning systems in order to reduce engine load variations associated with compressor cycling. In the system manufactured by the Harrison Radiator Division of General Motors Corporation, for example, the compressor displacement is controlled by regulating the compressor crankcase pressure. To this end, a pneumatic control valve integral to the compressor variably connects the compressor crankcase to the inlet (suction) and outlet (discharge) chambers of the compressor.

In an electronic version of the control, the control valve is mechanized with a solenoid valve positioned to achieve the ratiometric control. In one mechanization, the valve may be pulse-width-modulated at a variable duty cycle to alternately connect the crankcase to the inlet and outlet chambers. In another mechanization, the valve may be linearly positioned by controlling the solenoid current, a direct analog to the pneumatic control referred to above.

With any such control, the objective is to adjust the crankcase pressure as required to achieve a desired system condition, such as a desired system temperature or pressure. However, nonlinearities inherent in the operation of a variable displacement compressor make it difficult to achieve an accurate and stable control. For example, the control gain (which may be defined as the change in compressor displacement per unit change in PWM duty cycle in the case of an electronic control) varies with internal friction, ambient temperature and the system loading. This means that the variation occurs not only from compressor to compressor, but also in a given compressor installation with wear, ambient conditions and control setting.

SUMMARY OF THE PRESENT INVENTION

The present invention is directed to an improved electronic control of an air conditioning system variable displacement compressor in which the position of a ratiometric compressor control valve is controlled to achieve accurate and stable regulation of a specified system parameter. The control employs a combination of open-loop and closed-loop techniques specifically tailored t the nonlinear control characteristics of variable displacement compressors.

The control is described primarily in reference to a pulse-width-modulated mechanization, but is also applicable to a linear current control mechanization. In such case, the solenoid current is analogous to the duty cycle of pulse-width-modulation.

The control defines a fine control range in relation to the desired value of said specified system parameter. When the measured value of the parameter is outside the fine control range, the objective is to quickly reduce the error. This objective is achieved with a coarse gain closed-loop control of the compressor control point which quickly drives the measured value toward the desired value.

When the measured value is within the fine control range, the compressor duty cycle is set to one of three predetermined values. The first predetermined duty cycle, referred to herein as NDCLO, is designed to change the compressor capacity to produce a relatively small rate of decrease of the specified system parameter. The second predetermined duty cycle, referred to herein as NDCHI, is designed to change the compressor capacity to produce a relatively small rate of increase of the specified system parameter. The third duty cycle, referred to herein as NDC, is based on the average of said first and second predetermined duty cycles, and is designed to maintain the current capacity of the compressor. Selection among the three predetermined control points is based on the error between the measured and desired values of the specified system parameter. If the error is within a deadband range, the third predetermined value, NDC, is selected. If the error is outside the deadband range, the first or second predetermined values, NDCLO or NDCHI, are selected based on the sign of the error.

The control of this invention also employs an adaptive or automatic fine tuning of the predetermined control point values to compensate for compressor-to-compressor differences and changes in the operating conditions of a given compressor system. When the fine control mode operating conditions indicate that the first and/or second duty cycle values are not producing a sufficient corrective response of the specified system parameter, the respective value is adjusted in a direction to increase the rate of change of displacement. On the other hand, each overshoot and undershoot of the controlled system parameter with respect to the desired value during the fine control mode triggers an adjustment of the predetermined values NDCLO, NDCHI for decreasing the rate of change of displacement in fine control. As a result, the control values used in fine control not only adapt to a particular system, but also track gradual changes occurring due to wear, ambient conditions, etc.

Another aspect of this invention concerns an anticipation technique which shortens the transition from coarse control to fine control by minimizing gross overshoots of the specified system parameter. The anticipation control feature is effective during high rates of change of the system parameter, and when triggered, temporarily modifies the control point and the desired value of the specified parameter in a direction to slow or reverse the compressor displacement control.

DETAILED DESCRIPTION OF THE INVENTION

Figure 1:
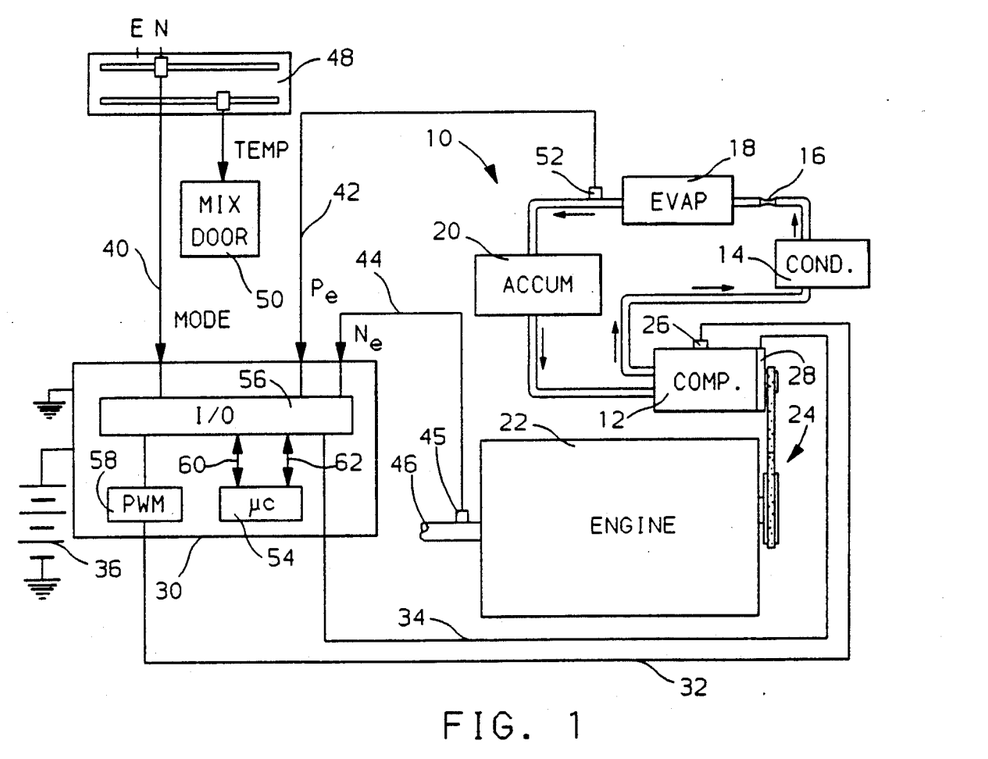
FIG. 1 is a block diagram of an automotive air conditioning system in accordance with the present invention, including a computer-based electronic control unit.

Referring to FIG. 1, the reference numeral 10 generally designates an automotive air conditioning system including a variable displacement refrigerant compressor 12, a condenser core 14, an expansion orifice 16, an evaporator core 18 and an accumulator 20. The compressor 12 is driven by the vehicle engine 22 via a belt and pulley drive arrangement generally designated by the reference numeral 24. For control purposes, the compressor 12 includes a pulse-width-modulated (PWM) solenoid valve 26 for alternately connecting the crankcase of compressor 12 to the inlet (suction) and outlet (discharge) pressures of the compressor at a controllable duty cycle. This effects a ratiometric control of the crankcase pressure between the inlet and outlet pressures, which in turn, controls the displacement of the compressor 12. An electromagnetic clutch 28 is controlled to selectively engage and disengage the pulley drive arrangement 24. An electronic control unit 30 controls the operation of the solenoid valve 26 and clutch 28 via lines 32 and 34, as explained below.

In the illustrated embodiment, the PWM duty cycle applied to solenoid valve 26 is inversely related to the resultant change in compressor displacement. That is, relatively high duty cycle energization of the solenoid valve 26 serves to decrease the capacity of, or destroke, the compressor 12, while relatively low duty cycle energization serves to increase the capacity of the compressor 12. An intermediate duty cycle energization in the range of approximately 50%-70%, i.e., the nominal duty cycle NDC, maintains the current capacity.

In operation, warm pressurized gaseous refrigerant discharged from the engine driven compressor 12 is cooled and liquefied by the condenser 14, which is typically air cooled. The orifice 16 rapidly decreases in the pressure of the condensed refrigerant, effecting further cooling of the same prior to its entry into the evaporator 18. Air ducted into the vehicle passenger compartment passes over the evaporator, thereby effecting heat transfer from the air to the refrigerant. The warmed refrigerant is then discharged to the accumulator 20, which separates out the gaseous portion for return to the inlet of compressor 12.

The control unit 30 is powered by the vehicle storage battery 36, and generates control signals for the compressor 12 and clutch 28 on lines 32 and 34 in response to various input signals received on lines 40–44. The MODE signal on line 40 is obtained from an operator manipulated control head 48, by which the operator designates the desired operating mode—normal (N) or economy (E). The control head 48 also serves to position a mix door 50 for regulating the temperature of the conditioned air supplied to the passenger compartment. The pressure signal Pe on line 42 is generated by a pressure solenoid valve 52 mounted at the outlet of evaporator 18 to sense the pressure of the gaseous refrigerant therein. Finally, the speed signal Ne on line 44 is generated by a speed sensor 45 responsive the rotary speed of the output shaft 46 of engine 22.

In operation, the control unit 30 uses the MODE and Ne signals on lines 40 and 44 to develop a control setting, designated herein as a pressure command PCMD for the outlet of the evaporator 18. The pressure signal Pe on line 42 is used as a feedback parameter, and the control unit 30 energizes the solenoid valve 26 via line 32 at a duty cycle chosen to bring the measured pressure signal Pe into correspondence with the pressure command PCMD.

Internally, the control unit 30 comprises a microcomputer (uC) 54 with both volatile and nonvolatile memory, an Input/Output (I/O) device 56, a pulse-width-modulation (PWM) driver 58, an address and control bus 60 and a data bus 62. The I/O device 56 receives the inputs on lines 40–44, and under the control of microcomputer 54, supplies a duty cycle command to the PWM driver 58. Flow diagrams representative of the program instructions executed by the microcomputer 54 are described below in reference to FIGS. 4A–4D and 5.

Fundamentally, the present invention is directed to duty cycle control of the solenoid valve 26 which achieves an accurate and stable control of the evaporator outlet pressure Pe at the command value PCMD. The control is carried out in two distinct modes, referred to herein as FINE CONTROL and COARSE CONTROL. When the pressure error |PCMD−PE| is relatively large, the COARSE CONTROL is operative to quickly drive the actual pressure Pe toward the command value PCMD. This control is effected with a high gain closed-loop control based on the magnitude and sign of the pressure error.

When the pressure error is relatively small, such as ±2 PSI, the COARSE CONTROL is interrupted, and the FINE CONTROL operates to energize the solenoid valve 26 at one of three predetermined duty cycle values. The first value, referred to herein as the nominal duty cycle NDC, is chosen to maintain the compressor displacement at the current setting. The second value, referred to herein as NDCLO, is chosen to produce a marginal rate of displacement increase. The third value, referred to herein as NDCHI, is chosen to produce a marginal rate of displacement decrease. Selection among the three predetermined duty cycle values is based on the pressure error. If the error is within a deadband range, the NDC value is selected. If the error is outside the deadband range, the NDCLO or NDCHI values are selected based on the sign of the error.

Figure 2:
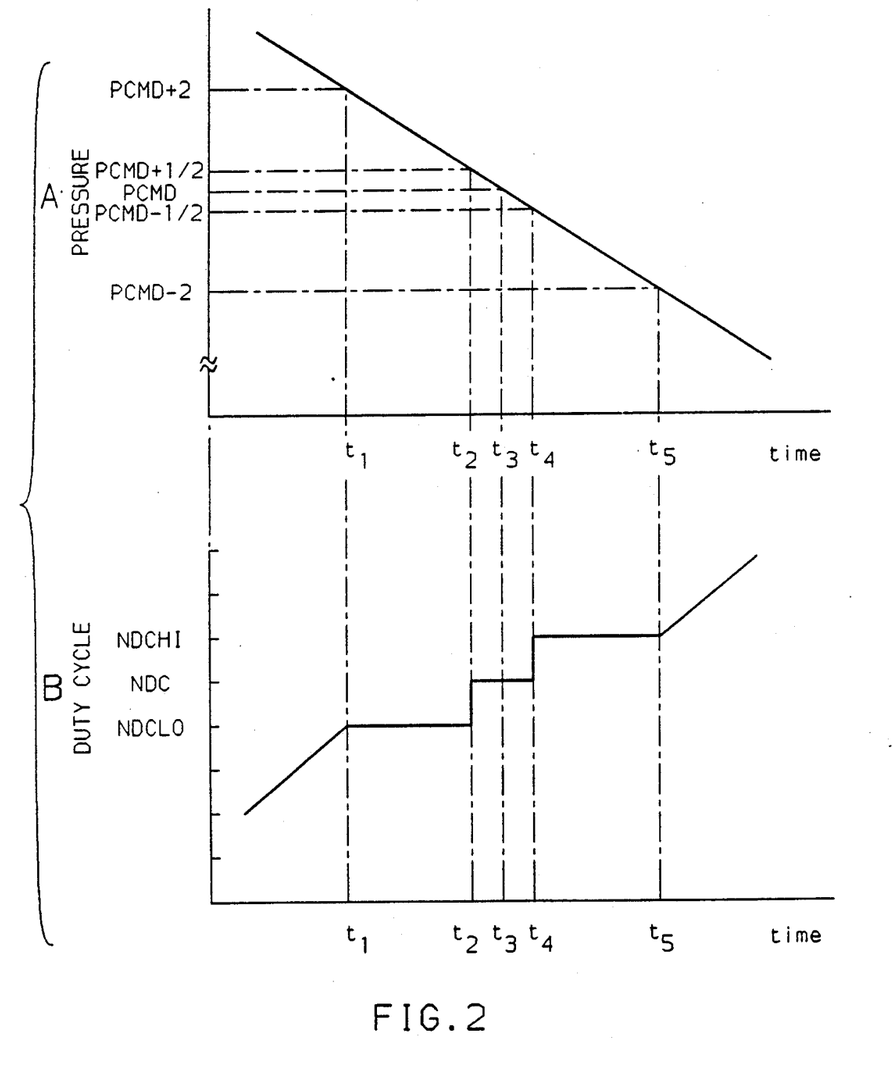
FIG. 2 is a graph depicting the relation between the compressor control point and the evaporator pressure error according to this invention.

The above control is illustrated in the graphs of FIG. 2, where Graph A depicts the evaporator pressure Pe in PSI and Graph B depicts the compressor solenoid valve duty cycle in percent on-time, both as a function of time. For purposes of illustration, the pressure command PCMD remains constant as seen in Graph A. The deadzone and FINE CONTROL ranges, depicted by broken horizontal lines, are defined in terms of pressure as (PCMD±½ PSI) and (PCMD±2 PSI), respectively.

Prior to time t3, the evaporator pressure Pe is above the commanded pressure PCMD, indicating an undercapacity condition. Prior to time t1, the pressure error exceeds 2 PSI, and the closed-loop COARSE CONTROL is used to determine the compressor duty cycle. Since the compressor is undercapacity, the commanded duty cycle decreases to upstroke the compressor with increasing error.

The closed-loop control law during the COARSE CONTROL mode is given by the expression:

$$DC = DC(OLD) + Kcoarse * (PCMD - Pe)$$

where Kcoarse is the closed-loop gain term. The duty cycle DC is updated every 100 msec, and the term DC(OLD) signifies the duty cycle value from the last update. For stability, the rate of change in duty cycle during closed-loop control is limited to approximately 15% per second.

In the interval t1-t2, the pressure error is within the FINE CONTROL range, but outside the deadband range. In this condition, the FINE CONTROL sets the compressor duty cycle to NDCLO. Initially, at least, NDCLO is empirically determined to produce a relatively low rate of increase in compressor displacement.

In the interval t2-t4, the pressure error is within the deadband of (PCMD±½ PSI), and the FINE CONTROL sets the compressor duty cycle to NDC, a nominal duty cycle chosen to maintain the compressor displacement at its current value. Like the term, NDCLO, the term NDC is initially empirically determined.

After time t3, the evaporator pressure Pe is above the commanded pressure PCMD, indicating an overcapacity condition. In the interval t4-t5, the pressure error is within the FINE CONTROL range, but outside the deadband range. In this condition, the FINE CONTROL sets the compressor duty cycle to NDCHI. Initially, at least, NDCHI is empirically determined to produce a relatively low rate of decrease in compressor displacement.

After time t5, the pressure error exceeds 2 PSI, and the above-defined closed-loop COARSE CONTROL is used to determine the compressor duty cycle. Since the compressor is overcapacity, the term (PCMD−Pe) is positive and the commanded duty cycle increases to destroke the compressor with increasing error.

As described below in reference to the flow diagrams of FIGS. 4A–4D and 5, the control of this invention also employs an adaptive or automatic fine tuning of the predetermined duty cycle values NDCLO, NDC and NDCHI to compensate for compressor-to-compressor differences and changes in the operating conditions of a given compressor system. The nominal, or no-change, value NDC is simply defined as the midpoint of NDCLO and NDCHI. When the fine control mode operating conditions indicate that the duty cycles NDCLO or NDCHI are not producing a sufficient corrective response of the evaporator pressure Pe, the respective value is adjusted in a direction to increase the rate of change of displacement. On the other hand, each overshoot and undershoot of the evaporator pressure Pe with respect to the command pressure PCMD during the FINE CONTROL mode triggers an adjustment of NDCLO or NDCHI in a direction to decrease the rate of change of displacement. As a result, the control values used in FINE CONTROL not only adapt to a particular system, but also track gradual changes in system gain occurring due to wear, ambient conditions, etc.

Figure 3:
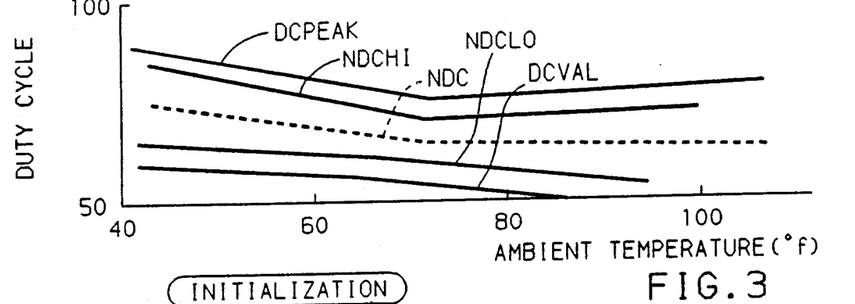
FIG. 3 is a graph illustrating the FINE CONTROL over a range of ambient temperature variation.

The effect of the above-described adaptive or automatic tuning feature is graphically illustrated in FIG. 3, which depicts the FINE CONTROL duty cycle values NDCLO, NDC and NDCHI as a function of the ambient or outside air temperature for a typical air conditioning system. The general trend of increased duty cycle values with decreasing ambient temperature occurs due to the ratiometric nature of PWM control and the temperature vs. pressure characteristics of the system refrigerant. With everything else being equal, lower ambient temperatures result in lower compressor discharge pressures. When the controller attempts to destroke the compressor under these conditions, a higher than normal solenoid valve duty cycle must be used to produce the required crankcase pressure for decreasing the compressor displacement. Similarly, when the controller attempts to upstroke the compressor under low ambient conditions, a higher than normal solenoid valve duty cycle must be used to produce the required crankcase pressure for increasing the compressor displacement. Under these conditions, the adaptive or automatic tuning feature of this invention detects that the duty cycles NDCLO and NDCHI are not producing a sufficient corrective response of the evaporator pressure Pe, and adaptively adjusts the values until the desired response is observed.

Another aspect of this invention described in reference to the flow diagrams of FIGS. 4A–4D and 5 concerns an anticipation technique which shortens the transition from COARSE CONTROL to FINE CONTROL by minimizing gross overshoots of the commanded pressure PCMD. The anticipation feature is effective during high rates of change of the evaporator pressure, and when triggered, temporarily modifies the commanded duty cycle and the commanded pressure in a direction to slow or reverse the change in compressor displacement.

The flow diagrams of FIGS. 4A–4D and 5 together represent a single loop program which is executed once every 100 msec for determining the pressure command PCMD and carrying out the control of this invention. The circled upper case letters A–H identify flow diagram jump points.

Figure 4A:
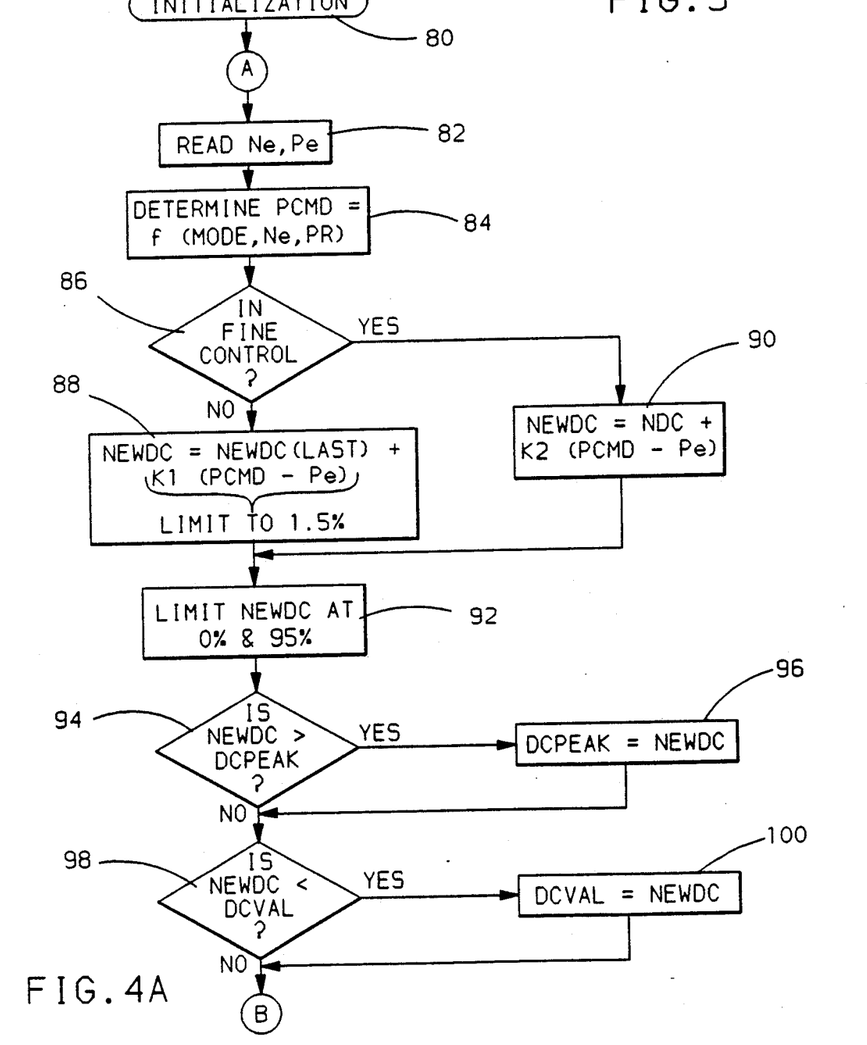
FIGS. 4A, 4B, 4C, 4D and 5 are flow diagrams representative of computer program instructions executed by the computer-based control unit of FIG. 1 in carrying out the control of this invention.

The flow diagram of FIG. 4A includes initialization and determination of the system pressure command PCMD and duty cycle NEWDC. The reference numeral 80 generally designates a series of instructions executed at the initiation of each period of vehicle operation for initializing various timers, flags and program variables of the control unit 30. In the illustrated embodiment, for example, the compressor duty cycle NEWDC is set to 0%, the compressor clutch 28 is engaged, a LOOP COUNTER is reset, and various parameters are initialized to nominal values.

Following initialization, the instruction blocks 82–84 are executed to read the various input values and to determine the value of the pressure command PCMD as a function of MODE, engine speed and the compressor pulley ratio PR. In a typical mechanization, the system would initially engage a pull-down mode for rapidly pulling the evaporator pressure down to a relatively low value such as 25 PSI. Thereafter, the normal (N) mode would typically command a pressure of about 30 PSI, whereas the economy (E) mode would command a pressure of about 40 PSI. The engine speed and pulley ratio dependency is employed to destroke the compressor 12 with increasing compressor speed.

The PWM duty cycle command NEWDC is determined by the instruction blocks 86–92. If the COARSE CONTROL mode is in effect, as determined at block 86, the block 88 is executed to compute the new duty cycle NEWDC (in percent) according to the expression:

$$NEWDC = NEWDC(LAST) + K1 * (PCMD - Pe)$$

where NEWDC(LAST) is the duty cycle from the previous execution of the program loop and K1 is a coarse control gain constant. The product K1 * (PCMD−Pe) is limited to 1.5% per loop, or 15% per second.

If the FINE CONTROL mode is in effect, the duty cycle will be set to NDCLO, NDC, or NDCHI as described above in reference to the graph of FIG. 2 and below in reference to the flow diagram portion shown in FIGS. 4C–4D. Nevertheless, the block 90 is executed to compute a "background duty cycle" according to the expression:

$$NEWDC = NDC + K2 * (PCMD - Pe)$$

where K2 is a fine control gain constant. For reasons described below, the gain constant K2 is chosen to yield an incremental change of approximately 10% per loop at a pressure error of 2 PSI.

In both the FINE CONTROL and COARSE CONTROL modes, the block 92 is executed to suitably limit the new duty cycle value NEWDC to keep it in the range of 0%–95%.

The blocks 94–100 are then executed to track the highest and lowest duty cycle commands computed by the blocks 88 or 90. The highest duty cycle is stored as the variable DCPEAK, and the lowest duty cycle is stored as the variable DCVAL. As described below in reference to the flow diagram portion of FIG. 4C, the terms DCPEAK and DCVAL are used to adaptively update the predetermined FINE CONTROL duty cycle values NDCLO, NDC and NDCHI.

Figure 4B:
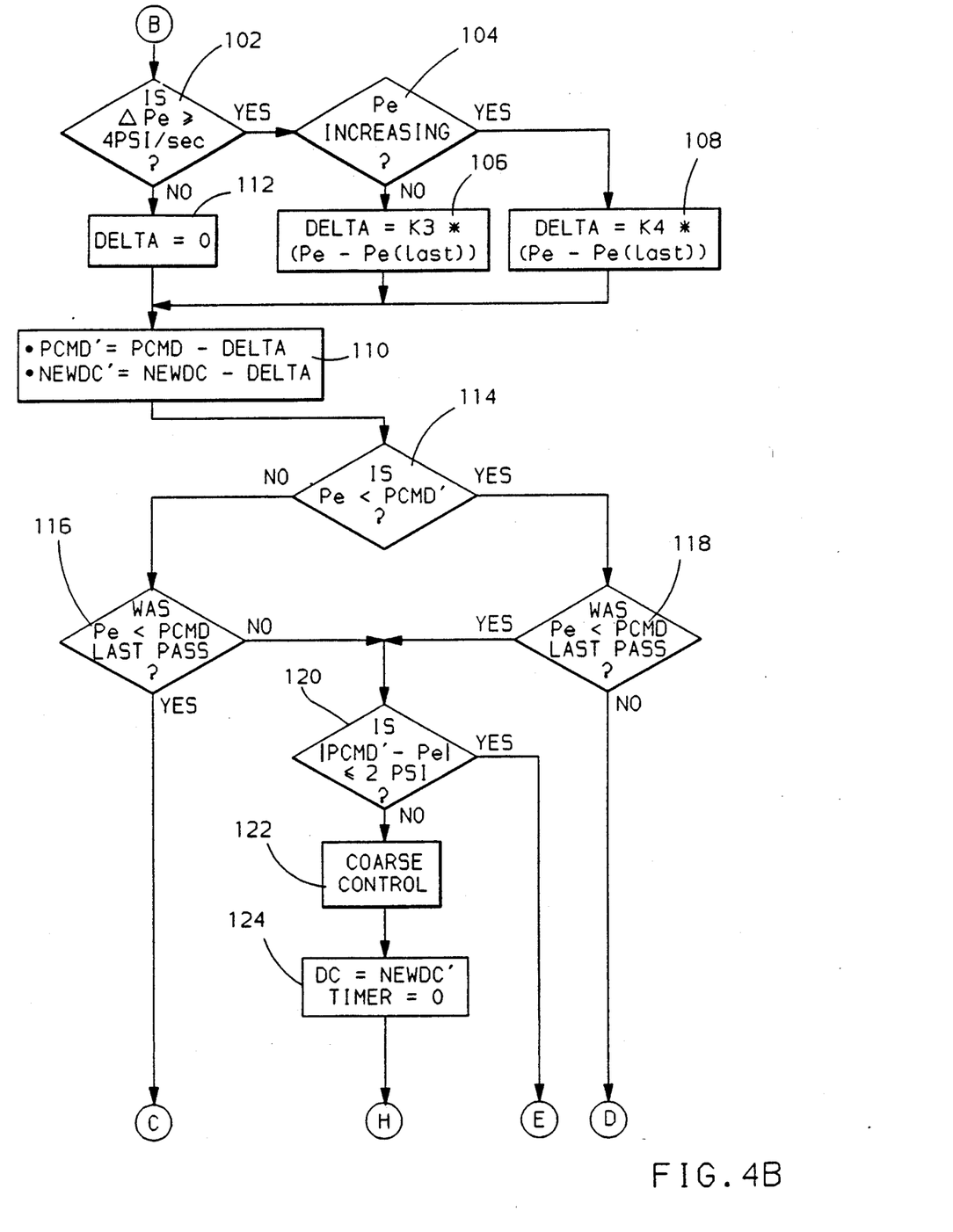

Referring to the flow diagram portion of FIG. 4B, the blocks 102–112 are then executed to adjust the pressure command PCMD and computed duty cycle NEWDC if the measured evaporator pressure is changing by more than the reference value of 0.4 PSI per loop, or 4.0 PSI per second. The adjustment provides an anticipation feature which avoids gross overshoots of the commanded pressure and faster transitions from COARSE CONTROL to FINE CONTROL. If the actual pressure is decreasing by more than 0.4 PSI per loop, as determined by blocks 102 and 104, the block 106 is executed to compute a correction term DELTA according to the expression:

$$DELTA = K3 * (Pe - Pe(LAST))$$

where K3 is a gain factor and (Pe−Pe(LAST)) represents the pressure change per loop. In this case, the term DELTA is negative, and as seen below, results in an increase of both the pressure command PCMD and the duty cycle NEWDC. If the actual pressure is increasing by more than 0.4 PSI per loop, the block 108 is executed to compute the correction term DELTA according to the expression:

$$DELTA = K4 * (Pe - Pe(LAST))$$

where K4 is a gain factor. In this case, the term DELTA is positive, and as seen below, results in an decrease of both the pressure command PCMD and the duty cycle NEWDC. In both cases, the pressure command and duty cycle modifications are effected by the block 110, which computes a modified pressure command PCMD' and a modified duty cycle NEWDC' according to the expressions:

$$PCMD' = PCMD - DELTA, \text{ and}$$

$$NEWDC' = NEWDC - DELTA$$

If the reference of 4.0 PSI/SEC is not exceeded, the block 112 is executed to reset DELTA to zero for canceling any previous pressure command and duty cycle modifications.

The above-described pressure command and duty cycle modifications are only in effect when the evaporator pressure Pe is rapidly changing. Together, they serve to reduce or reverse the rate of change of compressor displacement, and to force FINE CONTROL operation sooner than would otherwise occur. As indicated above, this reduces overshooting of the real pressure command PCMD, and enhances the transition from COARSE CONTROL to FINE CONTROL.

Figure 4C:
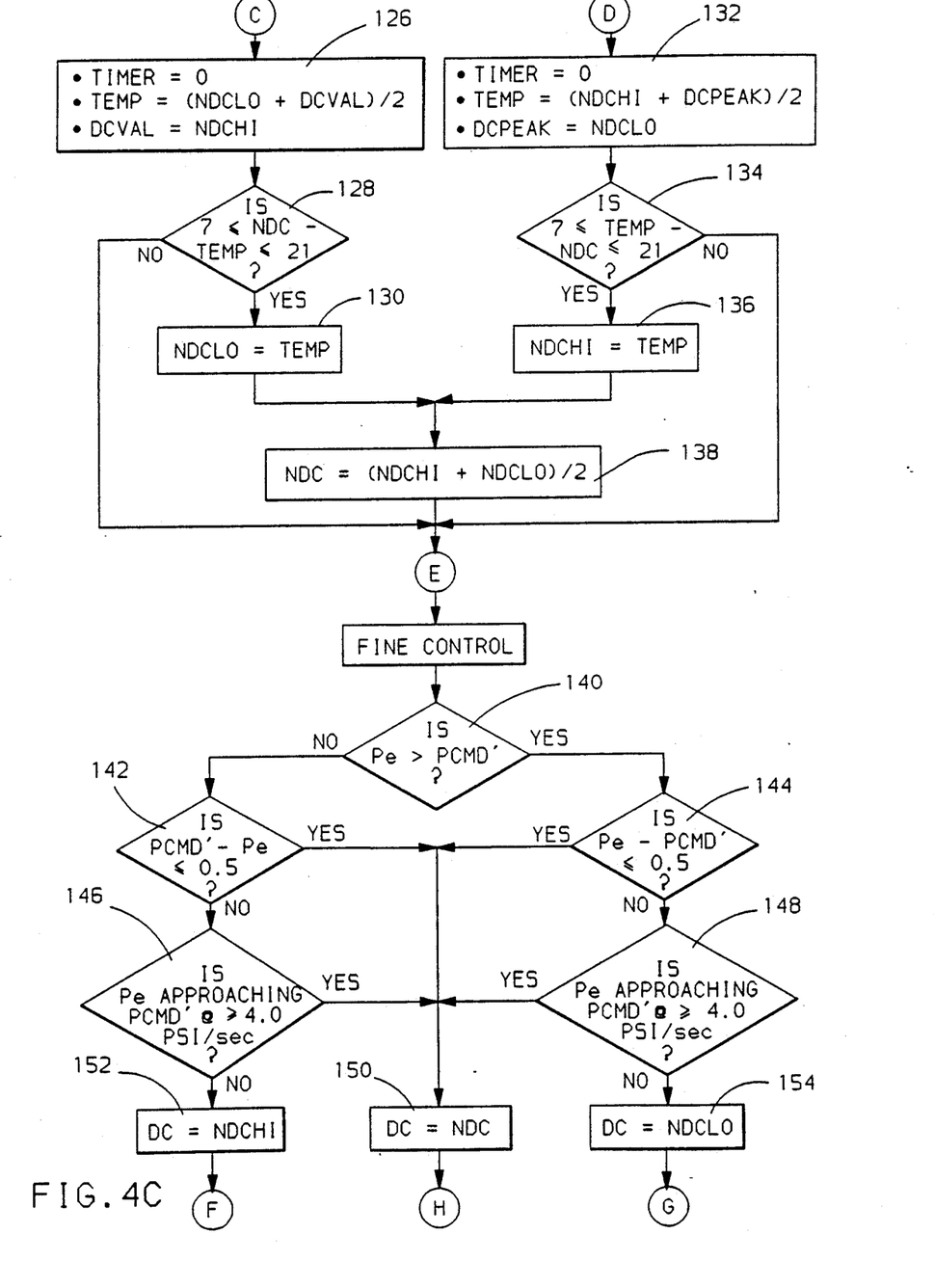

The blocks 114–138 of FIGS. 4B–4C primarily pertain to modifications of the FINE CONTROL duty cycle values NDCLO, NDC and NDCHI which decrease the rate of change of compressor displacement in FINE CONTROL. As indicated above, such modifications can only be made following an overshoot or undershoot of the pressure command. In addition, a TIMER is reset for use in the flow diagram of FIG. 4D.

If an overshoot has just occurred, as determined by the blocks 114–116, the blocks 126–130 are executed to set NDCLO equal to $$(NDCLO + DCVAL)/2$$

provided that (NDCLO+DCVAL)/2 is in the range of 7–21 PSI with respect to NDC. In other words, the current value of NDCLO is averaged with the lowest duty cycle observed since the last overshoot of the pressure command. The term DCVAL is then reset to NDCHI.

If an undershoot has just occurred, as determined by the blocks 114 and 118, the blocks 132–136 are executed to set NDCHI equal to $$(NDCHI + DCPEAK)/2$$

provided that (NDCHI+DCPEAK)/2 is in the range of 7–21 PSI with respect to NDC. In other words, the current value of NDCHI is averaged with the highest duty cycle observed since the last undershoot of the pressure command. The term DCPEAK is then reset to NDCLO.

Whenever NDCLO or NDCHI is so modified, the block 138 is executed to update the midpoint or nominal duty cycle NDC according to the expression:

$$NDC = (NDCHI + NDCLO)/2$$

Prior to entering FINE CONTROL, the above-described routine may operate to reduce NDCLO and increase NDCHI, thereby expanding the FINE CONTROL duty cycle range. Once in FINE CONTROL however, the duty cycle values (NEWDC) computed at block 90 of FIG. 4A stay between NDCLO and NDCHI due to selection of the fine control gain term K2 as indicated above. Thus, DCVAL is almost always greater than NDCLO, and DCPEAK is almost always less than NDCHI. As a result, there is a net decrease in the FINE CONTROL duty cycle range. The range of 7–21 PSI with respect to NDC represents a range of variation which might occur under ordinary circumstances, and modifications outside this range are excluded.

In most cases, no overshoot or undershoot will have just occurred, and the block 120 of FIG. 4B is executed to determine if the pressure error |PCMD'−Pe| is 2 PSI or less. If not, the blocks 122–124 are executed to activate COARSE CONTROL, setting the duty cycle to NEWDC' and resetting the TIMER of FIG. 4D.

Figure 5:
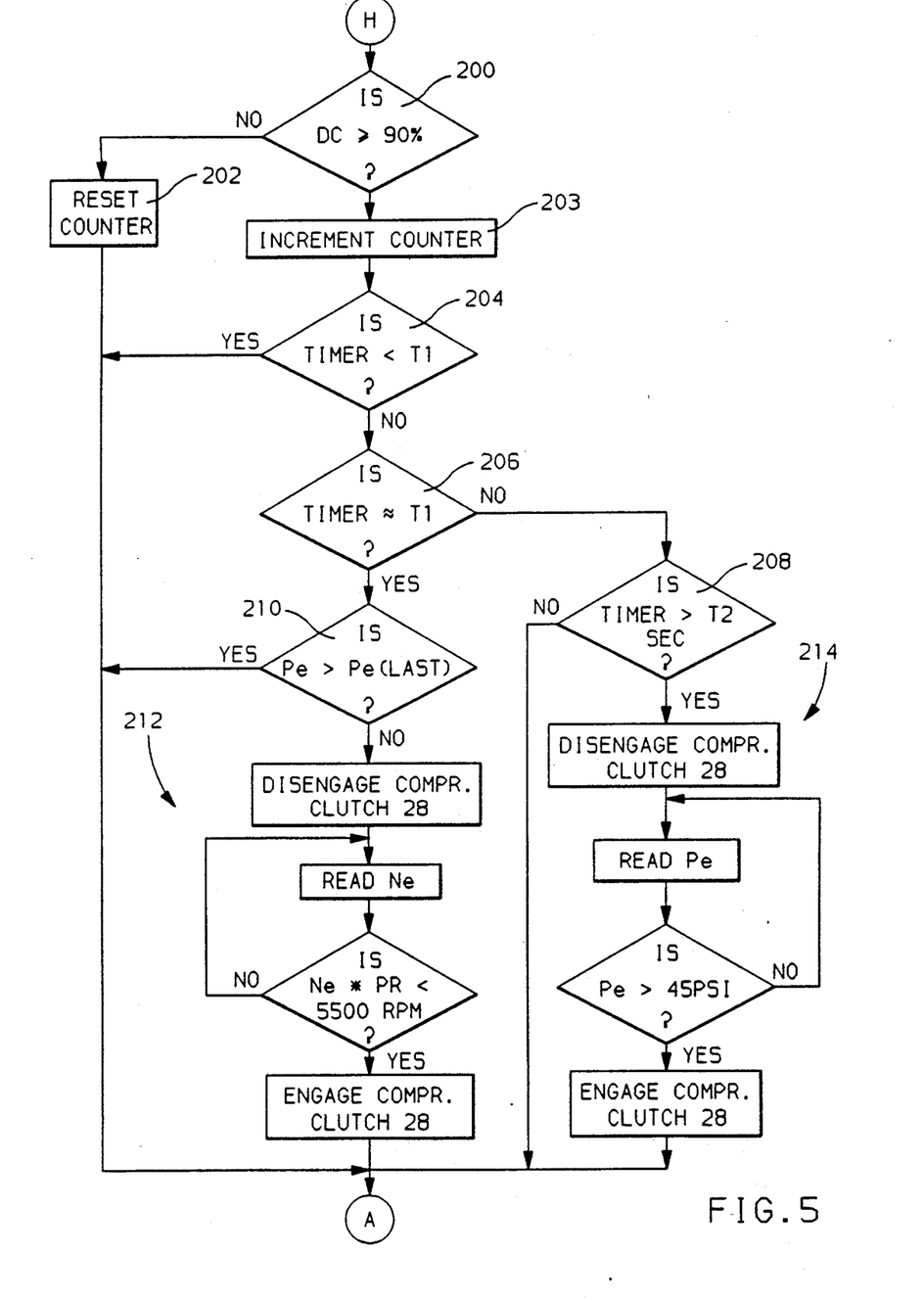

Thereafter, the output routine of FIG. 5 is executed as indicated by the circled letter H.

If block 120 determines that the pressure error is less than or equal to 2 PSI, or upon completion of the above-described FINE CONTROL modification routine, the FINE CONTROL of FIG. 4C is activated. The FINE CONTROL portion of the flow diagram performs the control described above in reference to the graph of FIG. 2 (blocks 140–154), and also adaptively modifies the FINE CONTROL duty cycle terms as discussed in reference to the graph of FIG. 3 (blocks 156–166).

Referring to blocks 140–154, the duty cycle output DC is set to NDC whenever the pressure error |PCMD'−Pe| is 0.5 PSI or less. The NDC value is also used per blocks 146, 148 if the actual pressure Pe is approaching the desired pressure PCMD' by 4.0 PSI/SEC or greater, even though the error is greater than 0.5 PSI. Absent such high rates of change of pressure however, the duty cycle is set to NDCHI if Pe is 0.5 to 2.0 PSI below PCMD' (block 152), and to NDCLO is Pe is 0.5 to 2.0 PSI above PCMD' (block 154).

Figure 4D:
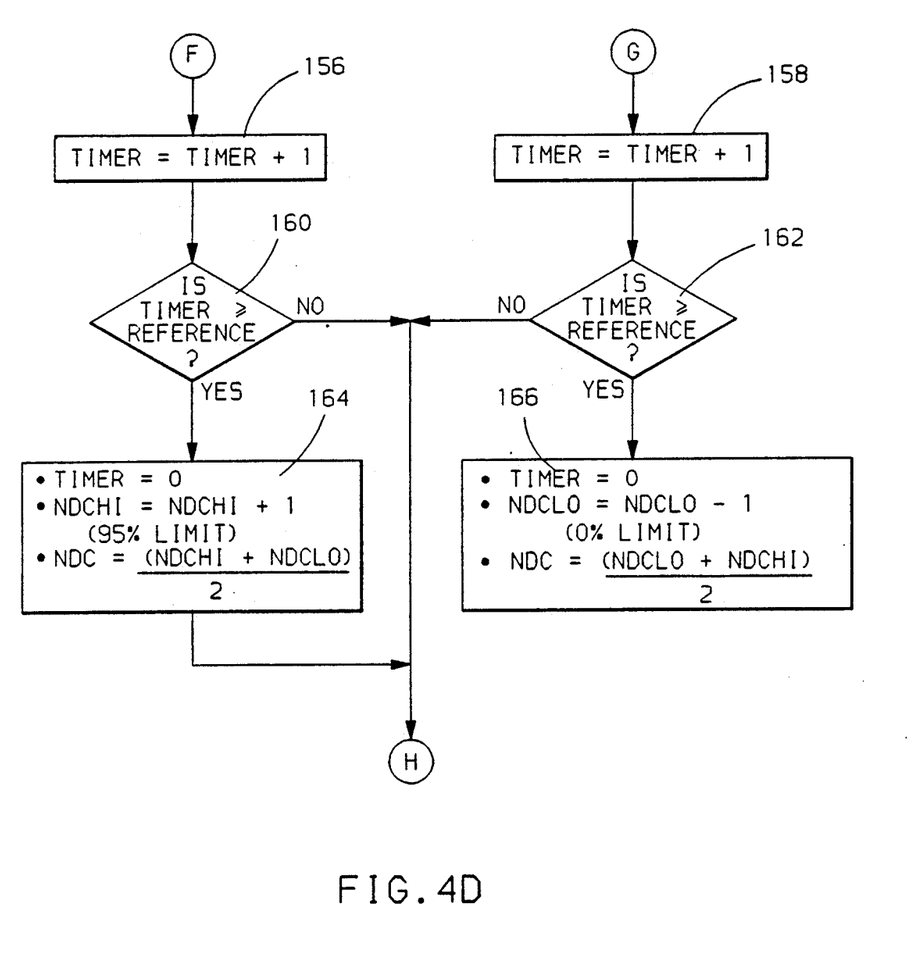

The TIMER referred to above is used in the modification routine of FIG. 4D to provide an indication of the time spent at NDCHI or NDCLO, as indicated at blocks 156 or 158, respectively. If the time spent exceeds a REFERENCE such as 1 second (blocks 160 or 162), the blocks 164 or 166 are executed to reset the TIMER, and to suitably update the FINE CONTROL duty cycle values NDCLO, NDC and NDCHI. The TIMER is also reset at each overshoot and undershoot of the pressure command as described above in reference to blocks 126 and 132.

If the time spent at NDCHI exceeds the REFERENCE, NDCHI is incremented by 1%, but not to exceed 95%. If the time spent at NDCLO exceeds the REFERENCE, NDCLO is decremented by 1%, but not to lower than 0%. In each case, the nominal or midpoint duty cycle term NDC is recomputed according to the average of NDCHI and NDCLO.

The above-described modifications counteract or oppose the modifications described above in reference to FIG. 4C. There, the effect was to narrow the FINE CONTROL duty cycle range based on short term excursions of the computed duty cycle term NEWDC reflecting the likelihood that NDCLO is too low or NDCHI is too high. Here, the effect is to widen the FINE CONTROL duty cycle range based on cumulative time spent at the FINE CONTROL limit values, reflecting the likelihood that NDCLO is not low enough or NDCHI is not high enough. Together, the two routines adaptively update the FINE CONTROL duty cycle values to track changes in the system operation, thereby ensuring that (1) NDCHI always produces small decreases in the compressor displacement, (2) NDCLO always produces small increases in compressor displacement, and (3) NDC always produces substantially no change in compressor displacement.

Referring to the flow diagram of FIG. 5, the decision block 200 is first executed to determine if the commanded duty cycle DC is greater than a relatively high reference such as 90%. If not, the block 202 is executed to reset a LOOP COUNTER, completing the routine and returning the microcomputer 54 to block 82 of FIG. 4A. If decision block 200 is answered in the affirmative, the LOOP COUNTER is incremented by block 203, and one or more of the decision blocks 204–208 are executed to compare the LOOP COUNTER value to a pair of reference intervals, designated T1 and T2.

If the LOOP COUNTER is less than T1, which may represent a relatively low value such as three seconds, the condition is assumed to be normal and the remainder of the routine is skipped. When the LOOP COUNTER value is one count more than three seconds (3.1 seconds), the decision block 210 is executed to determine if the current evaporator pressure Pe is greater than a previously determined evaporator pressure value Pe(LAST). If so, the compressor 12 is destroking, and the remainder of the routine is skipped. If not, the compressor is not destroking, and the flow diagram portion designated generally by the reference numeral 212 is executed to disengage the compressor clutch 28 until the compressor speed falls below a relatively high reference speed such as 5500 RPM.

If the compressor duty cycle stays above 90% for a relatively long time, such as 120 seconds, as determined by the decision block 208, the destroke is proceeding too slowly to ensure safe compressor operation. In such case, the flow diagram portion designated generally by the reference numeral 214 is executed to disengage the compressor clutch 28 until the evaporator pressure Pe rises above a relatively high reference pressure such as 45 PSI.

While this invention has been described in reference to the illustrated embodiment, it is expected that various modifications will occur to those skilled in the art. It will be understood, however, that systems incorporating such modifications may fall within the scope of this invention, which is defined by the appended claims.

The embodiments of the invention in which an exclusive property or privilege is claimed are defined as follows:

1. In an automotive air conditioning system including a refrigerant compressor having a capacity determined in accordance with the pressure in a control chamber thereof, and a control valve in communication with inlet and outlet ports of the compressor for effecting a ratiometric control of the pressure in said control chamber, control apparatus comprising:

means for measuring the value of a specified system parameter;

means defining a fine control range of values in relation to a desired value of said specified system parameter and a deadband range of values within said fine control range;

closed-loop control means effective when the measured value is outside said fine control range for operating the control valve at a setting determined at least in proportion to the difference between the measured and desired values; and open-loop control means effective when the measured value is within said fine control range for operating the control valve at (1) a first predetermined setting designed to change the capacity of the compressor in a direction to decrease the specified system parameter when the measured value is above said deadband range, (2) at a second predetermined setting designed to change the capacity of the compressor in a direction to increase the specified system parameter when the measured value is below said deadband range, and (3) at a third predetermined setting designed to maintain the current capacity of the compressor if the measured value is within said deadband range.

2. The apparatus as set forth in claim 1, wherein the setting DC determined by the closed-loop control means is repeatedly determined when the measured value is outside the fine control range, substantially according to the expression:

$$DC = DC(LAST) + K1(PCMD - Pe)$$

where DC9LAST) is a previously determined setting, K1 is a closed-loop gain term, PCMD is the desired value of the specified system parameter, and Pe is the measured value of the specified system parameter.

3. The apparatus set forth in claim 1, further including means effective when the measured value of the specified system parameter is changing at a rate in excess of a reference rate for modifying the desired value of the specified system parameter in a direction opposite to the direction of change of said measured value, thereby to produce a change in the compressor capacity for reducing the rate of change of said specified parameter.

4. The apparatus set forth in claim 3, wherein the desired value of the specified parameter is modified by an amount determined in relation to the rate of change of the measured value.

5. In an automotive air conditioning system including a refrigerator compressor having a capacity determined in accordance with the pressure in a control chamber thereof, and a control valve in communication with inlet and outlet ports of the compressor for effecting a ratiometric control of the pressure in said control chamber, control apparatus comprising:
   means for measuring the value of a specified system parameter;
   means defining a fine control range of values in relation to a desired value of said specified system parameter and a deadband range of values within said fine control range;
   closed-loop control means effective when the measured value is outside said fine control range for operating the control valve at a setting determined at least in proportion to the difference between the measured and desired values; and
   means defining (1) a first predetermined setting designed to change the compressor capacity to produce a relatively small rate of decrease of the specified system parameter, (2) a second predetermined setting designed change the compressor capacity to produce a relatively small rate of increase of the specified system parameter, and (3) a third setting based on the average of said first and second predetermined settings for maintaining the current capacity of the compressor;
   open-loop control means effective when the measured value is within said fine control range for operating the control valve at said first predetermined setting when the measured value is above said deadband range, at said second predetermined setting when the measured value is below said deadband range, and at said third setting if the measured value is within said deadband range;
   adaptive means responsive to the operation of said open-loop control means for updating the first and second predetermined settings as required to track changes in the operation of said system.

6. The apparatus set forth in claim 5, wherein said adaptive means modifies said first and second predetermined settings in a manner to increase the respective changes in compressor capacity when the open-loop control means continuously operates said control valve at said first and second predetermined settings for at least a reference time.

7. The apparatus set forth in claim 5, wherein said adaptive means includes:
   counter means for storing a count;
   means for periodically incrementing the stored count whenever the open-loop control means operates said control valve at said first or second predetermined settings;
   means for resetting the stored count each time the measured value of said specified system parameter crosses the desired value;
   means for (1) modifying the value of said first predetermined setting in a direction to increase the respective change in compressor capacity if the stored count exceeds a reference count while the control valve is operated at said first predetermined setting, and (2) modifying the value of said second predetermined setting in a direction to increase the respective change in compressor capacity if the stored count exceeds a reference count while the control valve is operated at said second predetermined setting.

8. The apparatus set forth in claim 5, wherein said adaptive means modifies said first and second predetermined settings in a manner to decrease the respective changes in compressor capacity when the measured value of said specified system parameter crosses the desired value.

9. The apparatus set forth in claim 5, wherein the adaptive means comprises:
   background means effective when the measured value is within said fine control range for computing a closed-loop background setting in relation to the difference between the measured and desired values of the specified system parameter;
   updating means effective when the measured value crosses the desired value for updating the first and second predetermined settings in relation to highest and lowest values of the computed background setting occurring since a previous crossing of said measured and desired values.

10. The apparatus set forth in claim 9, wherein the background means computes the background setting substantially according to the expression $$NDC + K2(PCMD - Pe)$$

where NDC is the third predetermined setting, K2 is a closed-loop gain term, PCMD is the desired value of the specified system parameter, and Pe is the measured value of the specified system parameter.

11. The apparatus set forth in claim 9, wherein:
   the background means includes means for identifying and storing (1) a first value corresponding to the highest value of said background setting, and (2) a second value corresponding to the lowest value of said background setting; and
   the updating means includes first means effective when the measured value crosses the desired value toward a lower limit of said fine control range for adjusting the first predetermined setting in the direction of said first stored value, and second means effective when the measured value crosses the desired value toward an upper limit of said fine control range for adjusting the second predetermined setting in the direction of said second stored value.

12. The apparatus set forth in claim 11, wherein the first means includes means for resetting the first stored value following the adjustment of said first predetermined setting, and the second means includes means for resetting the second stored value following the adjustment of said second predetermined setting.

* * * * *